United States Patent [19]

Horio et al.

[11] Patent Number: 4,794,482
[45] Date of Patent: Dec. 27, 1988

[54] MECHANISM FOR RETAINING A FLEXIBLE MAGNETIC SHEET IN POSITION FOR COMMUNICATION WITH A MAGNETIC HEAD

[75] Inventors: Motohiko Horio; Naoki Kobayashi; Hideo Kobayashi, all of Saitama, Japan

[73] Assignee: Fuji Photo Optical Co., Ltd., Saitama, Japan

[21] Appl. No.: 169,068

[22] Filed: Mar. 14, 1988

Related U.S. Application Data

[63] Continuation of Ser. No. 849,583, Apr. 8, 1986, abandoned.

[30] Foreign Application Priority Data

Apr. 11, 1985 [JP] Japan .................................. 60-77205

[51] Int. Cl.⁴ ........................ G11B 17/32; G11B 5/016
[52] U.S. Cl. .................................. 360/102; 360/99.05; 360/104; 360/130.34
[58] Field of Search .......................... 360/99, 102–106, 360/121, 122, , 128, 129, 130.34, 130.3; 369/261

[56] References Cited

U.S. PATENT DOCUMENTS

| 3,806,902 | 4/1974 | Prees et al. ........................... 360/129 |
| 4,296,448 | 10/1981 | Garcia et al. ..................... 360/99 X |
| 4,652,959 | 3/1987 | Hamada ..................... 360/130.34 X |
| 4,661,871 | 4/1987 | Nagashima ............................. 360/99 |

FOREIGN PATENT DOCUMENTS

| 53-91709 | 8/1978 | Japan .................................. 360/104 |
| 57-113460 | 7/1982 | Japan .................................... 360/97 |
| 57-162147 | 10/1982 | Japan .................................. 360/133 |
| 58-194165 | 11/1983 | Japan .................................. 360/103 |
| 59-54071 | 3/1984 | Japan .................................. 360/104 |
| 60-243867 | 12/1985 | Japan .................................. 360/104 |

OTHER PUBLICATIONS

Knappe et al, "Contoured Linear Pressure Pad for Fixed Spherical Head Recording on Flexible Disks," IBM Tech. Disc. Bull., vol. 24, No. 11B, Apr. 1982.

*Primary Examiner*—Stuart N. Hecker
*Assistant Examiner*—Benjamin E. Urcia
*Attorney, Agent, or Firm*—Sughrue, Mion, Zinn, Macpeak & Seas

[57] ABSTRACT

A magnetic head device comprises a first sheet retainer member which is adapted to be brought into contact with a magnetic recording sheet at a first position on one side of the magnetic recording sheet, a second sheet retainer member having a contact surface which is adapted to be brought into contact with the magnetic recording sheet at a second position near the first position on the other side of the magnetic recording sheet, and a magnetic head accommodated in an opening formed in the contact surface of the second sheet retainer member to be brought into contact with the magnetic recording sheet.

4 Claims, 3 Drawing Sheets

MECHANISM FOR RETAINING A FLEXIBLE MAGNETIC SHEET IN POSITION FOR COMMUNICATION WITH A MAGNETIC HEAD

This is a continuation of application Ser. No. 849,583 filed Apr. 8, 1986 and now abandoned.

BACKGROUND OF THE INVENTION

1. Field of the Invention

This invention relates to a magnetic head device for recording on and/or reproduction from a magnetic sheet.

2. Description of the Prior Art

In conventional magnetic recording and reproduction systems in which recording and reproduction is effected while a magnetic recording sheet is rotated on a spindle, a recording sheet retainer plate is used for bringing the magnetic recording sheet into closer contact with a magnetic head.

The sheet retainer plate has a recess on the surface opposed to the magnetic head and the magnetic head is pressed against the magnetic recording sheet at the recess so that the magnetic recording sheet is bulged into the recess.

This system is advantageous in that when the distance between the magnetic head and the retainer plate is proper, good contact of the magnetic head on the recording sheet can be obtained, but is disadvantageous in that the contact pressure of the magnetic head is significantly affected by a small change in the distance between the magnetic head and the retainer plate since the recording sheet is pressed against the retainer plate solely by the magnetic head. Accordingly, it is very difficult to adjust the distance between the magnetic head and the retainer plate to obtain good contact of the magnetic head on the recording sheet.

SUMMARY OF THE INVENTION

In view of the foregoing observations and description, the primary object of the present invention is to provide a magnetic head device in which good contact between the magnetic head and the magnetic recording sheet can be easily ensured.

The magnetic head device in accordance with the present invention comprises a first sheet retainer member which is adapted to be brought into contact with a magnetic recording sheet at a first position on one side of the magnetic recording sheet, a second sheet retainer member having a contact surface which is adapted to be brought into contact with the magnetic recording sheet at a second position near the first position on the other side of the magnetic recording sheet, and a magnetic head accommodated in an opening formed in the contact surface of the second sheet retainer member to be brought into contact with the magnetic recording sheet.

In the magnetic device of the present invention, the position of the magnetic head can be easily and precisely adjusted on the basis of the surface of the second retainer member.

If desired, the second sheet retainer member may have a second contact surface which is adapted to be brought into contact with the magnetic recording sheet at a third position on the same side of the magnetic recording sheet as the second position, the third position being near the first position on the side of the first position opposite to the second position. A second magnetic head may be provided in an opening formed in the second contact surface.

The inventors' experiment using a magnetic head device having a retainer plate 21 provided with a recess at a central portion thereof as shown in FIG. 7 has revealed that the magnetic recording sheet 22 is bulged into the recess, pushed by the magnetic head 23, and is brought into contact with the edge portions A and B of the recess. As the recording sheet is rotated, the edge portions A and B wear and after the edge portions A and B have worn to a certain extent, the magnetic recording sheet 22 comes into closer contact with the edge portions A and B.

The present invention has been made based on this discovery. That is, the magnetic head device of the present invention having the arrangement described above is obtained by disposing the first sheet retainer member, the second sheet retainer member and the magnetic head respectively in the positions of the magnetic head 23, the sheet retainer plate 21 and at least one of the edge portions A and B in FIG. 7.

DESCRIPTION OF THE PREFERRED EMBODIMENTS

Figure 1:
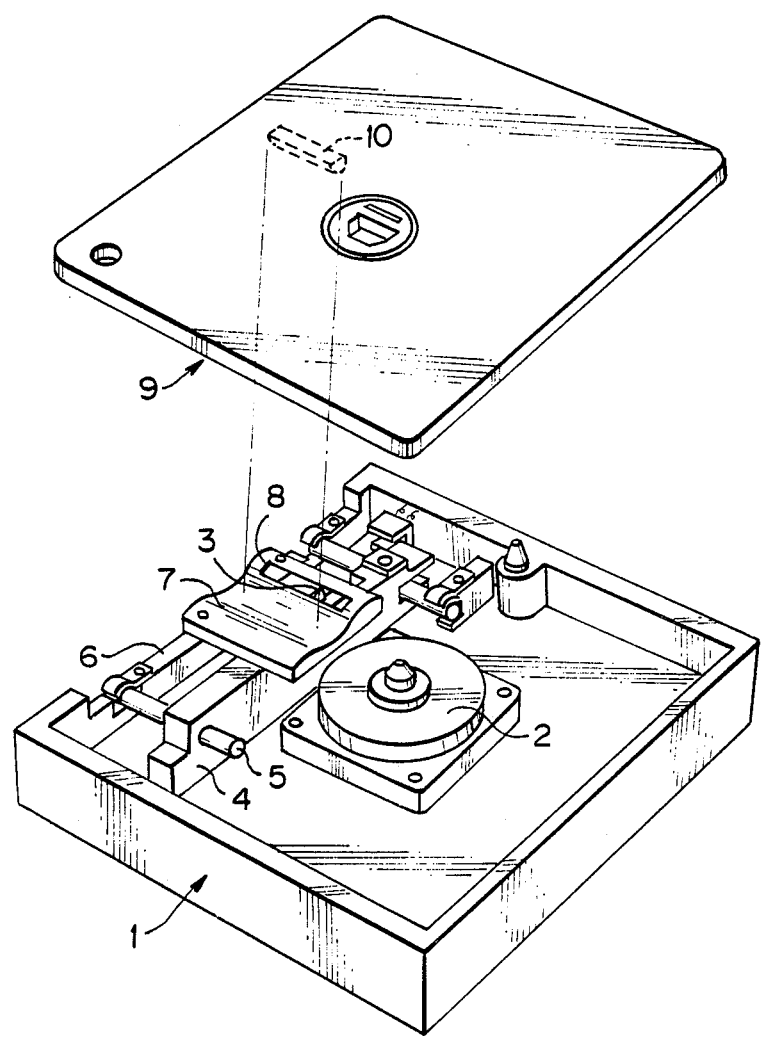
FIG. 1 is an exploded perspective view of a magnetic head device in accordance with an embodiment of the present invention.

In FIG. 1, a magnetic head device in accordance with an embodiment of the present invention includes a housing comprising a housing body 1 and a lid member 9. A spindle 2 for holding and rotating a magnetic recording disk is mounted in the housing body 1 substantially at the center thereof, and a carriage board 4 carrying a magnetic head 3 is provided beside the spindle 2. The carriage board 4 is connected to a screw arm 5, which is driven by a carriage motor (not shown), to be moved to bring the magnetic head 3 to a desired recording track on the magnetic recording disk. A retainer plate 7 is fixed to a body frame 6 to extend over the magnetic head 3. The retainer plate 7 is provided with a recess substantially at the center thereof with a pair of shoulders formed on opposite sides of the recess. An elongated opening 8 is formed in one of the shoulders and the upper end of the magnetic head 3 projects through the opening 8.

On the inner surface of the lid member 9 is mounted a retainer member 10 so that the lower edge portion thereof is opposed to the bottom of the recess of the retainer plate 7 when the lid member 9 is attached to the housing body 1.

Figure 2:
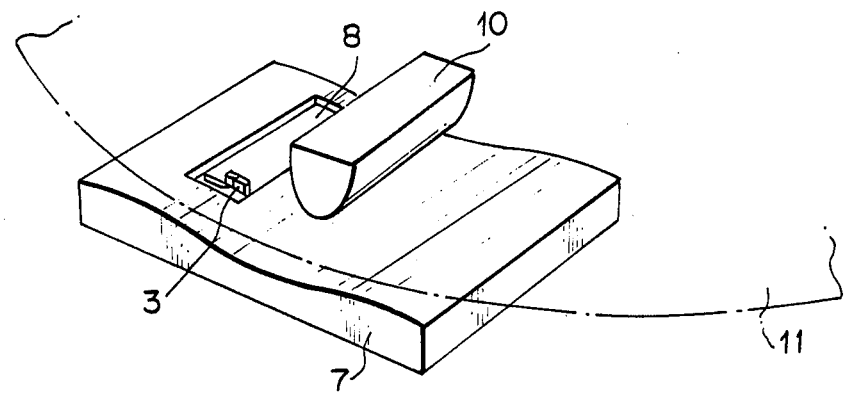
FIG. 2 is a fragmentary enlarged perspective view of a part of the magnetic head device of FIG. 1.
Figure 3:
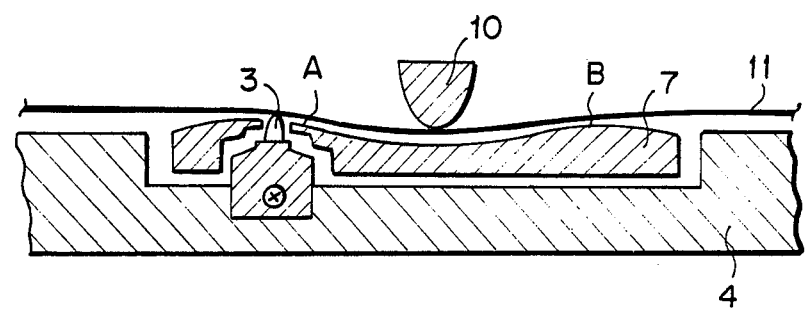
FIG. 3 is a fragmentary enlarged cross-sectional view of a part of the magnetic head device of FIG. 1.

FIGS. 2 and 3 show the condition in which a magnetic recording disk 11 is placed between the retainer plate 7 and the retainer member 10 and the magnetic head 3 acts on the magnetic recording disk 11 for recording or reproduction.

The magnetic recording disk 11 is formed of flexible material and is bulged into the recess of the retainer plate 7 when pushed by the retainer member 10, and the magnetic recording disk 11 is brought into contact with the shoulders of the retainer plate (indicated at A and B in FIG. 3) on the opposite sides of the recess. Thus, in the figure the magnetic recording disk 11 is brought into contact with the magnetic head 3 projecting through the shoulder A.

The shoulders A and B are formed so that when the magnetic recording disk 11 is bulged toward the bottom of the recess by being pushed by the retainer member 10 as shown in FIG. 3, the recording disk 11 is brought into close contact with the shoulders A and B with minimum wear.

That is, in the magnetic head device of this embodiment, the magnetic recording disk 11 is brought into contact with the shoulder A over a certain area, and accordingly, the contact pressure of the magnetic head 3 on the magnetic recording disk 11 cannot be substantially affected by a small change in the distance between the retainer plate and the retainer member 10. Further, since the magnetic recording disk 11 is held in good contact with the shoulders A and B, the contact of the magnetic head 3 with the magnetic recording disk 11 can be controlled to an optimal state by adjusting the amount of projection of the magnetic head 3 from the surface of retainer plate 7.

As can be understood from the description above, an optimal contact of the magnetic head 3 and the magnetic recording disk 11 can be easily obtained in the magnetic head device of this embodiment.

Figure 8:
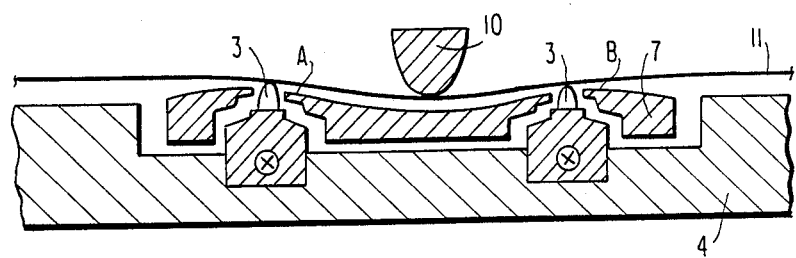

Though the magnetic head is only provided in the shoulder A in the embodiment described above, the magnetic head may be provided in the shoulder B or in each of the shoulders A and B as shown in FIG. 8. In the case where two magnetic heads are provided, one in each of the shoulders A and B, the two magnetic heads may be either for the same functions or different functions. For example, one may be for recording and reproduction of image data while the other may be for reading out information. Otherwise, the two heads may be of the same type to effect recording/reproduction simultaneously on two tracks.

Figure 4:
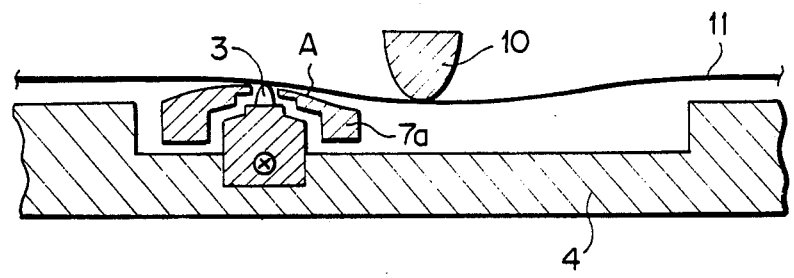
FIG. 4 is a view similar to FIG. 3 but showing a modification of the magnetic head device of FIG. 1, FIGS. 5 and 8 are views similar to FIG. 3 but showing other modifications of the magnetic head device of FIG. 1.
Figure 5:
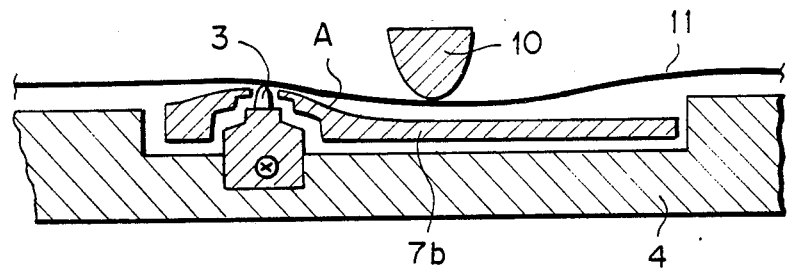

Though in the embodiment described above, the retainer plate 7 is shaped to provide a pair of shoulders, the retainer plate may be shaped to provide only a single shoulder as indicated at 7a and 7b in FIGS. 4 and 5 so long as only one magnetic head is provided. The retainer plate 7a shown in FIG. 4 is of a shape such as is obtained by cutting the retainer plate 7 of the embodiment described above at the base of the shoulder A while the shape of the retainer plate 7b shown in FIG. 5 is such as is obtained by removing the shoulder B from the retainer plate 7.

Also in the modifications respectively having the retainer plates shown in FIGS. 4 and 5, an optimal contact of the magnetic head 3 and the magnetic recording disk 11 can be easily obtained.

In the embodiment described above in conjunction with FIGS. 1 to 3 and in the modifications thereof, the magnetic head 3 is accommodated in the elongated opening 8 to be moved in the opening 8 to be brought to the desired track on the magnetic recording disk 11. That is, the retainer plate (7, 7a or 7b) is fixed with respect to the housing body 1 and the magnetic head 3 is arranged to be movable with respect to the retainer plate in a radial direction of the magnetic recording disk 11. However, the retainer member may be arranged to be moved along with the magnetic head.

Figure 6:
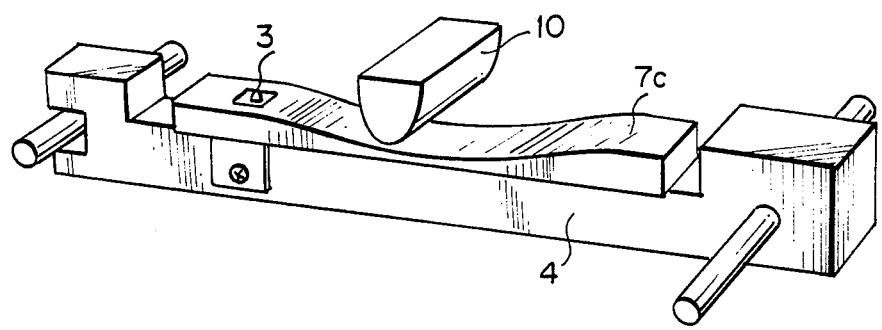
FIG. 6 is a view similar to FIG. 2 but showing another embodiment of the present invention.
Figure 7:
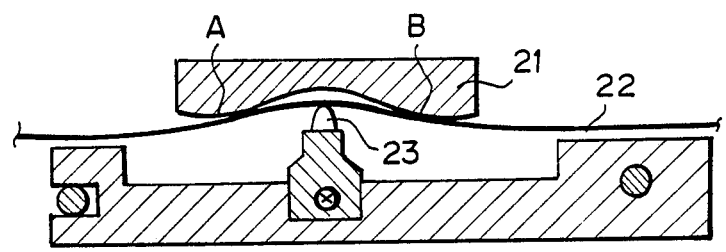
FIG. 7 is a cross-sectional view for illustrating the principle of the present invention.

In the embodiment shown in FIG. 6, the retainer plate 7c is smaller in width than the retainer plate 7 in the embodiment described above, and the magnetic head 3 is moved together with the retainer plate 7c. The retainer plate 7c may be the same in shape as those shown in FIGS. 4 and 5.

We claim:

1. A retaining mechanism for retaining a flexible magnetic sheet in a position for magnetic communication with a magnetic head, comprising:

a lower retaining member having a first convex portion with a slot therein and positioned with respect to said magnetic head and said magnetic sheet so that said magnetic head communicates with the underside of said magnetic sheet through said slot, said lower retaining member having a second convex portion displaced from said first convex portion to form a recess between said convex portions; and an upper retaining member of convex shape which penetrates said recess in said lower member, and which is positioned on the opposite side of said magnetic sheet from said lower retaining member to thereby press said flexible magnetic recording sheet into said recess.

2. A retaining mechanism as recited in claim 1, wherein said lower retaining member comprises:

a second slot in said second convex portion positioned with respect to a second magnetic head and said magnetic sheet so that said second magnetic head communicates with the underside of said magnetic sheet thru said second slot.

3. A retaining mechanism as recited in claim 1, wherein said magnetic sheet is a magnetic disc rotatable about an axis and said lower retaining member remains stationary with respect to said axis, and wherein said slot is elongated to thereby permit said magnetic head to move radially relative to said flexible magnetic recording disc.

4. A retaining mechanism as recited in claim 1, wherein said magnetic sheet is a magnetic disc and said lower retaining member moves radially relative to said flexible magnetic recording disc.

* * * * *